Patented Aug. 9, 1932

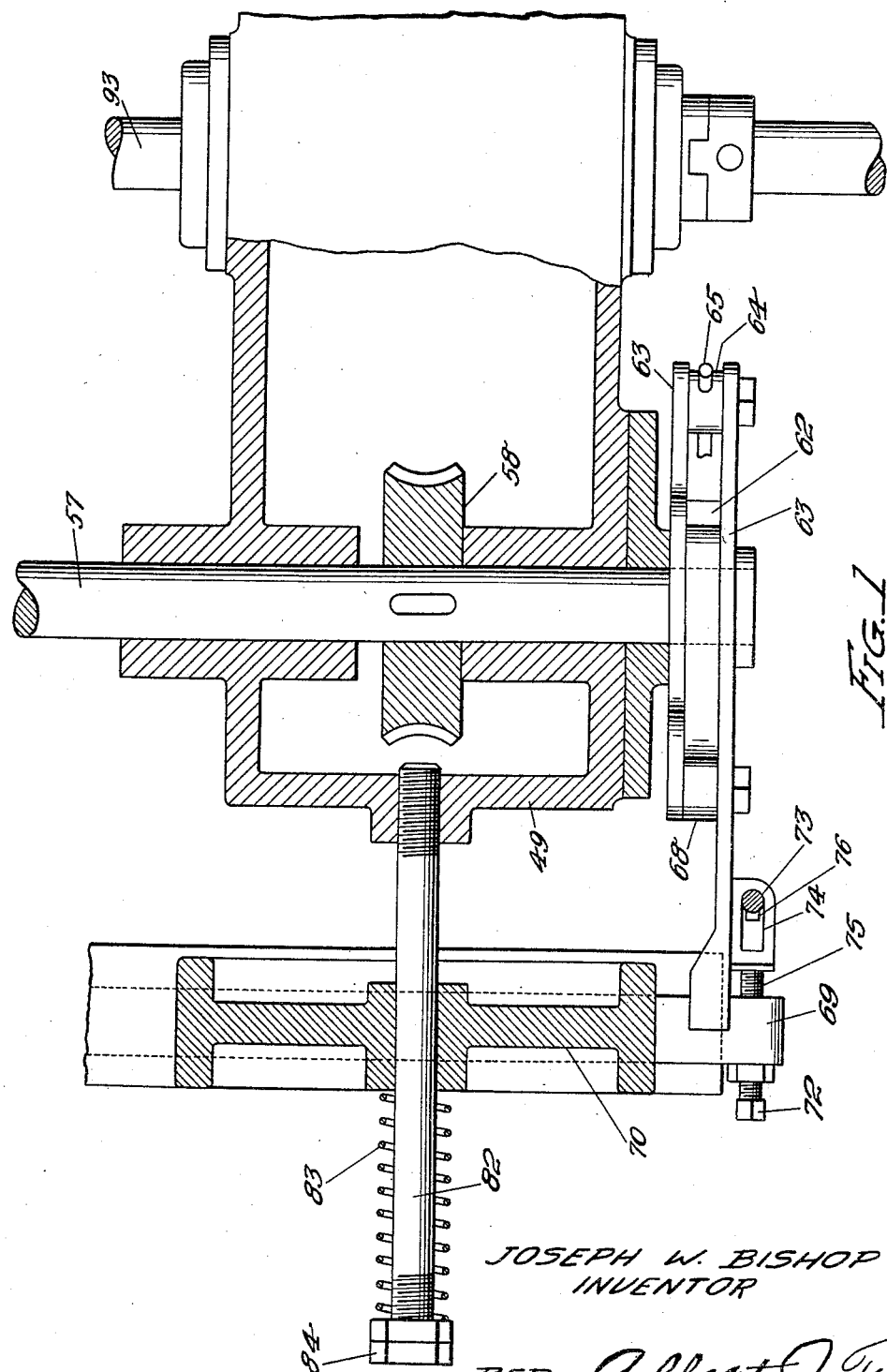

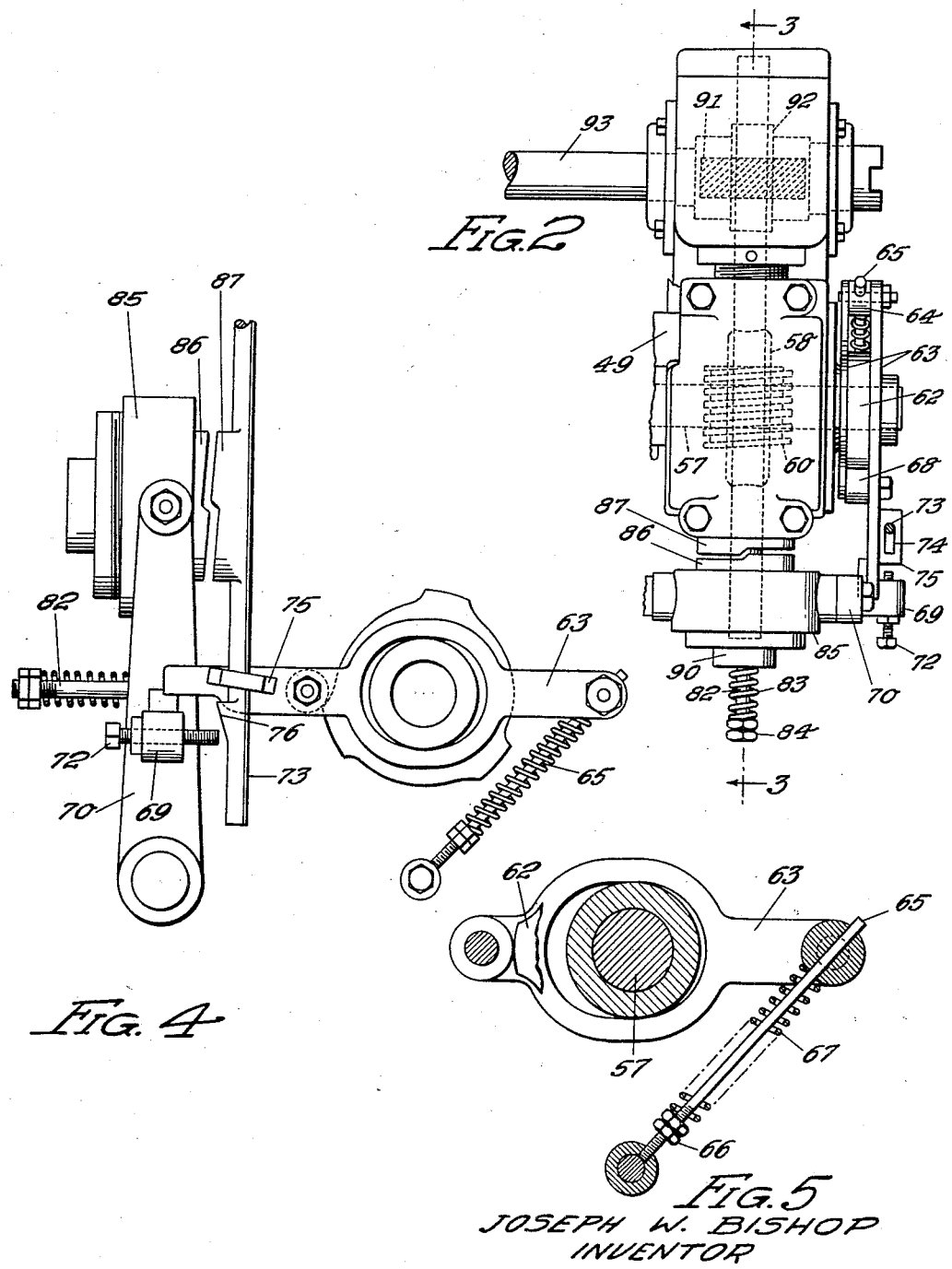

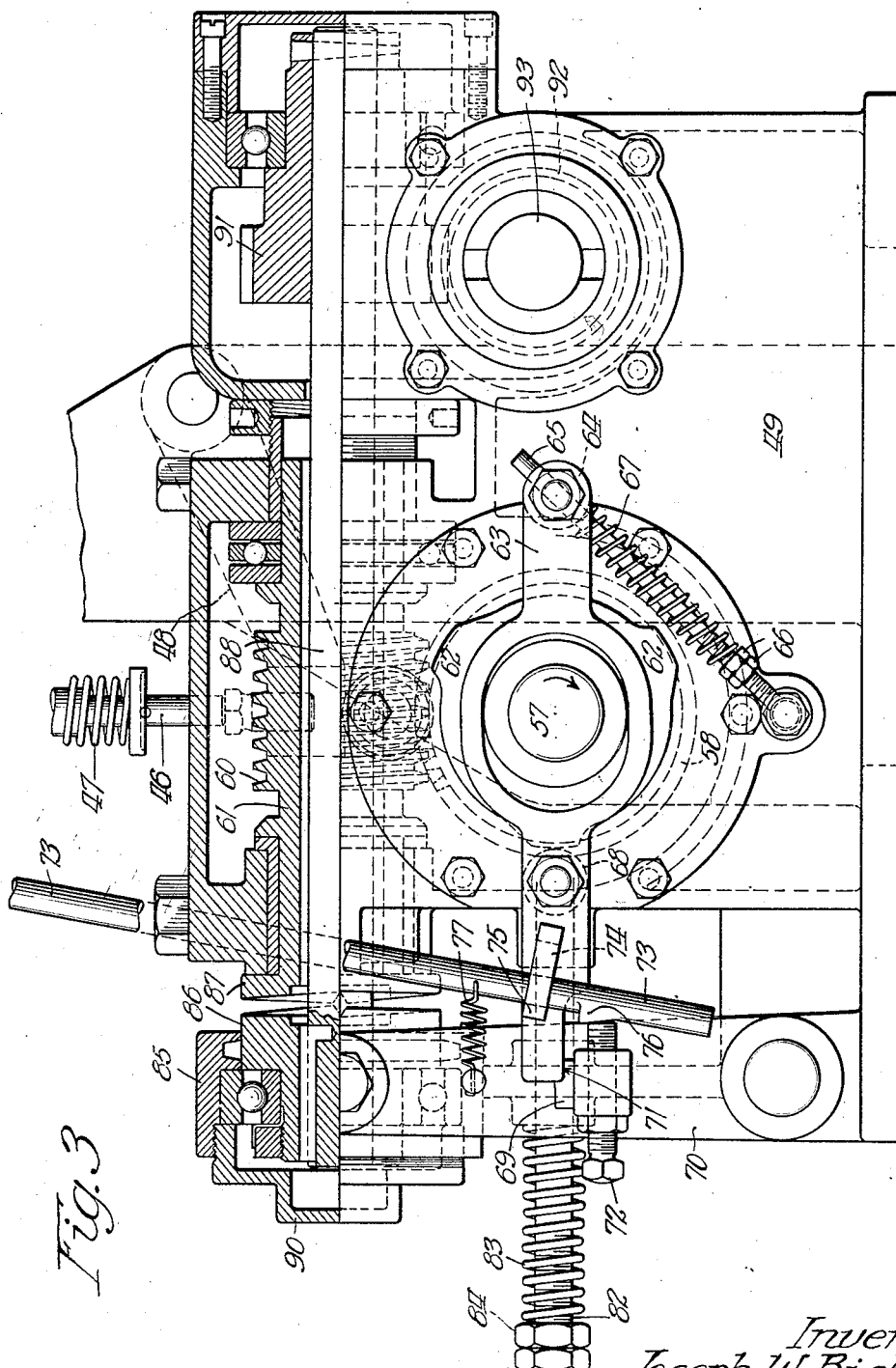

1,870,226

UNITED STATES PATENT OFFICE

JOSEPH W. BISHOP, OF MUSKEGON, MICHIGAN, ASSIGNOR TO THE BRUNSWICK-BALKE-COLLENDER COMPANY, OF CHICAGO, ILLINOIS, A CORPORATION OF DELAWARE

CLUTCH

Application filed January 27, 1928. Serial No. 249,842.

This invention relates to an improved clutch and has for one of its principal objects the provision of means for coupling a driving and a driven shaft wherein the same are automatically uncoupled after a predetermined movement of the driven shaft regardless of the position of operation of the manual control for the clutch itself.

Another important object of this invention is to provide a special clutch for use particularly with devices of this sort but which clutch is also adapted for other uses.

Other objects and advantages will appear as the description proceeds.

Referring to the accompanying drawings:

Figure 1 is a top plan view of the improved clutch of this invention, parts being shown in section and parts broken away.

Figure 2 is a plan view of the clutch casing and associated parts, certain pertinent features being illustrated in dotted lines.

Figure 3 is a view, partially in elevation and partially in section, of the main operating features of the clutch, showing the same in released position.

Figure 4 is a view somewhat similar to Figure 3, portions however being omitted, but showing the actuating parts about to be automatically released after an operation or revolution.

Figure 5 is a detail view of devices for controlling the movement of a cam shaft.

Referring particularly to Figure 1, the operating mechanism of the clutch of this invention comprises essentially a shaft 57, which shaft can be utilized for operating a partial or full revolution cam, or a series of such cams. Other uses for the partial or full revolution of the shaft 57 can be made and will be apparent.

The shaft 57 has fixed thereon a worm gear 58 (Fig. 2) which meshes with a worm 60 on a hollow shaft 61 (Fig. 3). A series of cam portions 62 are also secured to the shaft 57 and are disposed between a pair of plates 63 each of which has an opening which permits tilting and limited sliding movement of the plates on the shaft 57 (Fig. 5).

At one end the plates 63 are held in fixed relation by a spacer member 64 having reduced ends mounted to turn in openings in the plates. The spacer member has an opening therein which slidably receives the end of a rod 65 (Figs. 1 and 3) which at its lower end is pivoted on the support 49 and is threaded to receive nuts 66. The nuts are adjustable to vary the tension of a spring 67 coiled about the rod 65 and compressed between the nuts and the spacer member 64.

Adjacent their other ends the plates 63 are spaced apart by a roller 68. The outer of the two plates extends laterally and is engageable with an abutment 69 on a pivoted arm 70 (Fig. 3) which has a guide portion 71 on which the end of the plate is slidable, the plate constituting a latch for preventing movement of the abutment in a direction towards the shaft 57.

A screw 72 is threaded in the abutment and is engageable with a rod 73 which extends through an opening 74 in a guide lug 75 on the latch or plate and the rod 73 has a catch 76 which is engageable with the lug 75 on the upward movement of the rod. A spring 77 tends to draw the rod towards the arm 70 so as to insure the engagement of the catch with the lug.

The upper end of the rod 73 can be manually controlled in any desired manner.

The arm 70 has an opening therein which receives a rod 82 that is secured to the support 49 and a spring 83 is compressed between the arm 70 and a nut 84 adjustable on the rod 82.

The arm 70 is divided at its upper end and is secured to a holder 85 for a clutch member 86 which is engageable with a clutch member 87 rigid with the hollow shaft 61.

The clutch member 86 is keyed to slide on a shaft 88 within the hollow shaft 61 an end of which is covered by a cap 90 that is secured to the holder 85.

The shaft 88 extends through the hollow shaft 61 and has a gear 91 thereon which meshes with a gear 92 on a driving shaft 93.

In the operation of this clutch the rod 73 is lifted upwardly in any desired manner and this upward motion will bring the catch 76 into engagement with the lug 75. The lug 75 forming part of the end of the outer plate 63, this end of the plate will accordingly be elevated and will become disengaged from the abutment 69 on the pivoted arm 70.

The spring 83 then forces the arm 70 in a clockwise direction as viewed in Fig. 3 and brings the clutch member 86 into engagement with the clutch member 87. The shaft 88 which is being driven continuously is then in driving relation with the hollow shaft 61 which, by means of the worm 60 and the worm gear 58, moves the shaft 57 in the direction indicated by the arrow in Fig. 3.

After the operator releases the latch from engagement with the abutment 69 the latch is moved to the right as viewed in Fig. 3 as the rotation of the shaft 57 causes a movement of one of the cams 62 upwardly out of engagement with the roller 68, permitting this travel of the latch. The spring 67 acting upon the spacer member 64 next brings the latch into engagement with the guiding portion 71 of the abutment 69. The continued movement of the shaft 57 then brings the succeeding cam 62 into engagement with the roller 68, forcing the latch to the left as viewed in Fig. 3 and causing it to displace the abutment 69 and the arm 70, thereby releasing the clutch member 86 from the clutch member 87 and interrupting the drive of the hollow shaft 61. This brings the shaft 57 to rest.

In the event that through a mistake, the operator should, after the actuation of the manual control member, continue to hold the rod 73 in elevated position, this will not prevent the shaft 57 and the cams thereon from stopping at the desired point, for the reason that the cam 62 will at all events force the latch to the left. This brings the rod 73 into engagement with the screw 72 moving the rod backwardly in the opening 74, and preventing the catch 76 from retaining the lug 75. The latch will then drop downwardly into engagement with the guiding portion 71 of the abutment 69 and will move the abutment until the clutch member 86 disengages from the clutch member 87.

My invention is not limited to the specific details of the modification shown and described, but diverse alterations are contemplated within the spirit of the invention, and a substantial range of equivalents is contemplated within the scope of the appended claims.

What I claim and desire to secure by Letters Patent is:

1. The combination of a driving shaft, a driven shaft, means including a pair of clutch members for transmitting power from said driving shaft to said driven shaft, a cam on said driven shaft, means tending to throw one of said clutch members into engagement with the other, means actuated by said cam for throwing said one of said clutch members out of engagement with said other and holding it out of engagement, said means being releasable to permit reengagement of said clutch members, a manually movable member, means operable by movement of said manually movable member to a certain position to release the second mentioned means, said second mentioned means being operable after the release thereof to again move said one of said clutch members out of engagement with said other clutch member and means for preventing the retention of said manually controlled member in said position from actuating the second mentioned means.

2. The combination of a driving shaft, a driven shaft, means including a pair of clutch members for transmitting power from said driving shaft to said driven shaft, a pivoted arm connected to one of said clutch members for moving the same, resilient means acting on said arm for forcing said one of said clutch members into engagement with the other, a member mounted for tilting and sliding movement on said driven shaft and having an end engageable with said arm, a cam on said driven shaft for forcing the tiltable member into engagement with said arm and thereby disengaging one of said clutch members from the other, yieldable means tending to maintain said tiltable member in engagement with said arm and manually operable means for moving the tiltable member out of engagement with said arm and permitting said one of said clutch members to reengage said other clutch member.

3. The combination of a driving shaft, a driven shaft, a manually controlled member, means operable on the actuation of said manually controlled member to couple said shafts in driving relation, means operative even though said manually controlled member be held continuously in the position in which it initially actuated the first mentioned means, for automatically uncoupling said shafts after a predetermined movement of said driven shaft, said means comprising cams on the driven shaft, and means for retaining said cams in operative position on the driven shaft, said means comprising a pair of juxtaposed plates slidably mounted with respect to the shaft and in parallel relation to the cams.

4. The combination of a driving shaft, a driven shaft, a manually controlled member, means operable on the actuation of said manually controlled member to couple said shafts in driving relation, means operative even though said manually controlled member be held continuously in the position in which it initially actuated the first mentioned means, for automatically uncoupling said shafts after a predetermined movement of said driven shaft, said means comprising cams on the driven shaft, means for retaining said cams in operative position on the driven shaft, said means comprising a pair of juxtaposed plates slidably mounted with respect to the shaft and in parallel relation to the cams, and resilient means for moving said plates into and out of clutch operating position.

5. The combination of a driving shaft, a driven shaft, a manually controlled member, means operable on the actuation of said manually controlled member to couple said shafts in driving relation, means operative even though said manually controlled member be held continuously in the position in which it initially actuated the first mentioned means, for automatically uncoupling said shafts after a predetermined movement of said driven shaft, said means comprising cams on the driven shaft, means for retaining said cams in operative position on the driven shaft, said means comprising a pair of juxtaposed plates slidably mounted with respect to the shaft and in parallel relation to the cams, and resilient means for moving said plates into and out of clutch operating position, depending upon the position of the clutch actuating and releasing latch.

JOSEPH W. BISHOP.